United States Patent [19]
Raith et al.

[11] Patent Number: 5,546,464
[45] Date of Patent: Aug. 13, 1996

[54] METHOD OF AND APPARATUS FOR SELECTIVE RESYNCHRONIZATION IN A DIGITAL CELLULAR COMMUNICATIONS SYSTEM

[75] Inventors: Krister A. Raith, Durham, N.C.; Paul W. Dent, Stehag, Sweden

[73] Assignee: Ericsson Inc., Research Triangle Park, N.C.

[21] Appl. No.: 307,220

[22] Filed: Sep. 16, 1994

[51] Int. Cl.[6] .................. H04L 9/18; H04L 9/12
[52] U.S. Cl. .................. 380/48; 380/34; 380/21; 380/20; 380/49; 380/9; 380/10; 380/43; 380/46
[58] Field of Search .................. 380/48, 34, 21, 380/20, 49, 9, 10, 43, 46

[56] References Cited

U.S. PATENT DOCUMENTS

| | | | |
|---|---|---|---|
| 5,060,266 | 10/1991 | Dent | 380/49 |
| 5,081,679 | 1/1992 | Dent | 380/48 |
| 5,241,598 | 4/1993 | Raith | 380/21 |
| 5,293,423 | 3/1994 | Dahlin et al. | 380/48 |
| 5,404,355 | 4/1995 | Raith | 370/95.1 |

Primary Examiner—Thomas H. Tarcza
Assistant Examiner—Hrayr A. Sayadian
Attorney, Agent, or Firm—Robert A. Samra; Eric L. Stasik

[57] ABSTRACT

In a ciphered digital cellular communications system a method and apparatus are presented for selective resynchronization of the cipher upon initial channel acquisition or handoff. Where synchronization between the old channel and the new channel exists, the base station indicates along with an ITCD or handover message that no resynchronization is required. Where synchronization between the old channel and the new channel does not exist, the base station provides an indication along with an ITCD or handover message that resynchronization is required and from the content of this message the manner in which resynchronization is to be achieved is further indicated. By providing options for resynchronization security may be optimized or compromised for handover speed depending upon the specific requirements of the base station or the mobile station.

35 Claims, 7 Drawing Sheets

METHOD OF AND APPARATUS FOR SELECTIVE RESYNCHRONIZATION IN A DIGITAL CELLULAR COMMUNICATIONS SYSTEM

RELATED APPLICATIONS

This application is related to U.S. patent application Ser. No. 08/147,254 entitled "A Method for Communicating in a Wireless Communication System" to Raith, et al., filed Nov. 1, 1993, now U.S. Pat. No. 5,404,355, assigned to the assignee of the present invention and incorporated herein by reference. This application is also related to co-pending U.S. patent application Ser. No. 07/956,640 entitled "Digital Control Channel" to Raith, filed Oct. 5, 1992, assigned to the assignee of the present invention and incorporated herein by reference. This application is further related to co-pending U.S. patent application Ser. No. 08/203,028 entitled "A Method and Apparatus for Handing Off Mobile Station from a First to a Second Channel in a Mobile Communication System" to Andersson, et al., filed Feb. 28, 1994, assigned to the assignee of the present invention and incorporated herein by reference.

FIELD OF THE INVENTION

The present invention relates to digital cellular communication systems, and more particularly, to a method and apparatus to, upon hand-off, selectively establish and maintain cipher synchronization between a base station and mobile station for the encryption of data communications within such a system.

BACKGROUND OF THE INVENTION

In a digital radio communications system which carries voice or data traffic, some measure of signal privacy must be provided. As information broadcast using radio waves is subject to interception by anyone having an appropriate receiver, the information must undergo some sort of encryption prior to transmission if privacy is to be achieved. Normally, encryption involves ciphering the information by combining the information in some way with what is commonly termed a secret key to produce an encrypted signal. In order that only the intended receiver be able to decrypt the encrypted signal, both the intended receiver and the base station must be in possession of the same secret key.

One known encryption technique relies on a keystream generator and modular arithmetic or finite math. A plurality of secret key bits and a series of clock pulses are applied to the keystream generator which generates a stream of pseudo-random bits referred to as a keystream. The keystream bits are then bit-by-bit modulo-2 added to the information bits prior to transmission by the sender. An identical keystream generator is used by the receiver to produce an identical keystream of bits which are then bit-by-bit modulo-2 subtracted from the received encrypted data stream to recover the original information. Proper implementation of this technique requires that the sender and receiver keystream generators be synchronized so that the keystream generated at the receiver and subtracted from the encrypted data is in harmony with the keystream generated at the sender and added to the original data. An encryption technique which generates a large number of complex keystream bits and which may be implemented in a general purpose Arithmetic and Logic Unit (ALU) is disclosed in, for example, U.S. Pat. No. 5,148,485 entitled "Encryption System For Digital Cellular Communication", incorporated herein by reference in its entirety.

A variety of approaches to the issue of synchronization may be found in prior art encryption systems. In most encryption systems, synchronization may be viewed as an agreement between the sender and the receiver on the number of clock pulses to be applied from a common initial state until the generation of a particular bit. Other prior art encryption systems, however, do not keep a running count of the number of applied clock pulses and rely, instead, on the initialization of the sender and receiver to the same state at the beginning of a frame and the application of an identical number of clock pulses thereafter. The shortcoming of the latter scheme is the difficulty of reestablishing synchronization should the sender and receiver fall out of synchronization during a particular frame.

Another type of encryption system includes a counter which maintains a count of the number of keystream bits, or blocks of keystream bits, previously generated. The output bits of the counter are combined with the secret key bits to generate the keystream. Because the transmitter and receiver counters are incremented on a regular basis and, therefore, take on the characteristics of a digital time/date clock, such an encryption system is often referred to as a time-of-day driven encryption system.

The advantage of the time-of-day driven encryption system resides in the fact that if the receiver counter falls out of synchronization with the transmitter counter and the system has the capability of providing the receiver with the current transmitter counter value, the receiver counter may be immediately reset to the transmitter counter value instead of returning to the beginning and applying the entire history of clock pulses. The difficulty with such a system, however, is the provision of the transmitter counter value on a sufficiently frequent basis to avoid the accumulation of errors caused by the divergence of the receiver counter value from the transmitter counter value for a relatively long period of time.

A continuous synchronization technique which may be used to synchronize a time-of-day encryption system and to prevent the aforementioned accumulation of errors is disclosed in, for example, U.S. Pat. No. 5,060,266 entitled "Continuous Cipher Synchronization for Cellular Communication System" and incorporated herein in its entirety by reference.

Figure 1:
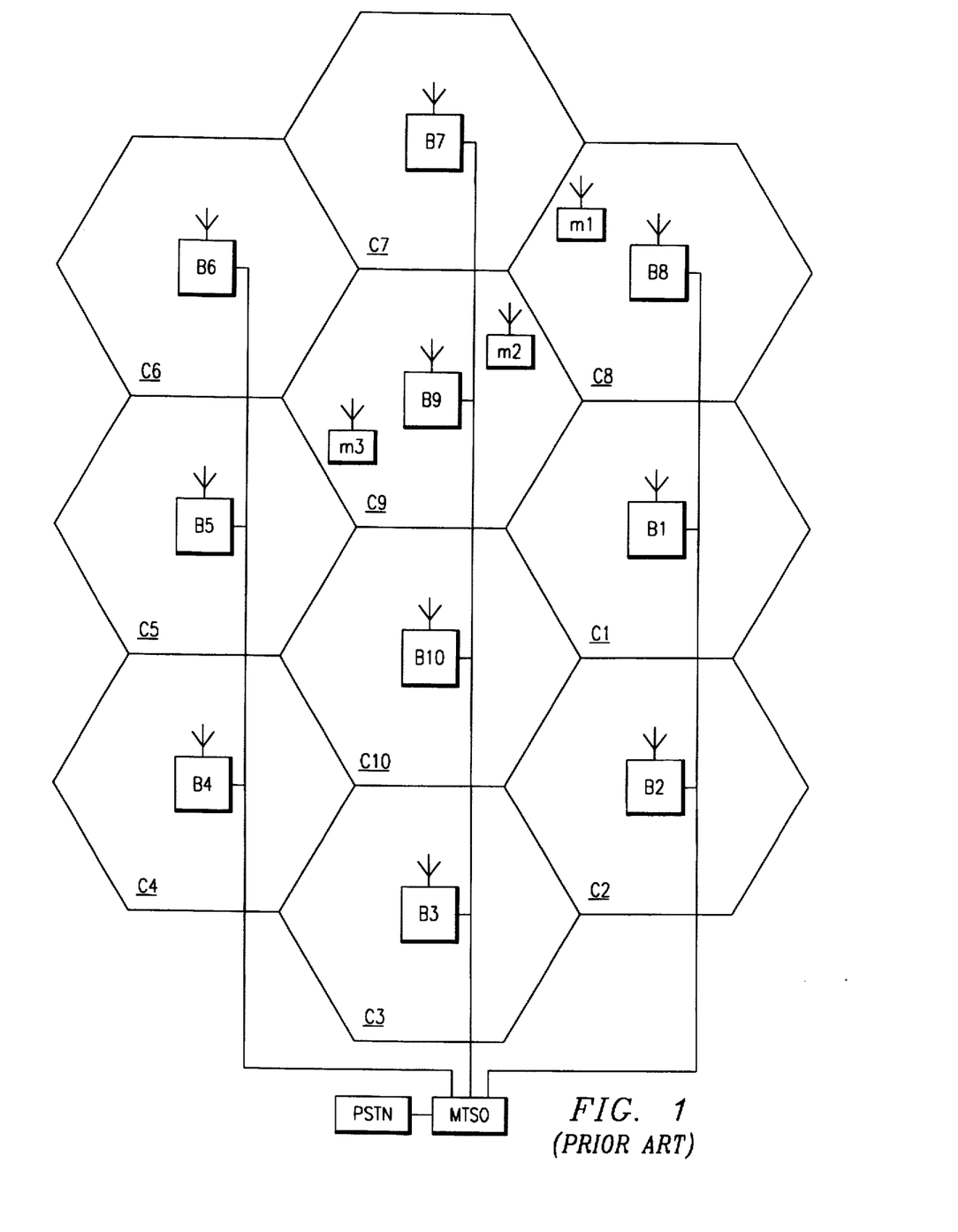
FIG. 1 is a pictorial representation of a cellular radio communication system including a mobile telephone switching office, a plurality of base stations and a plurality of mobile stations.

In FIG. 1 is shown a conventional cellular communications system comprising a plurality of cells C1–C10. Each cell has an associated base station B1–B10, each of which is connected to the mobile telephone switching office (MTSO) and subsequently to the public switched telephone network (PSTN) according to known and existing techniques. Base stations B1–B10 effect radio communications with mobile stations m1–m3. The number of active mobile stations m1–m3 located in each cell is essentially limited by the number of available channels within each cell. Moreover, the location of the mobile stations m1–m3 within the system is dynamic. As is obvious to one of ordinary skill in the art, a practical cellular communications system may comprise many hundreds of cells and many thousands of mobile stations. A cellular system comprises the base stations, mobile stations, and MTSOs owned by a particular operator. In many cities, more than one such system may exist.

Because each of the cells C1–C10 in a cellular radio system may be relatively small in size, the likelihood of one of the mobile stations m1–m3 traveling out of one cell and into another cell is great. As the mobile stations travel through the cellular system, they may reach the radio coverage limit of one cell and, therefore, be better served by another cell. Since cellular communication systems are most often interference, rather than noise, limited, a particular mobile station may also be better served by another channel on the same base station. The process of switching an established call from one channel to another is known as hand-off. There are basically three types of hand-off: 1) intra-cell hand-off occurs when the mobile station moves between different channels in the same cell, 2) inter-cell hand-off occurs when the mobile station moves to a different, neighboring cells, and 3) inter-system hand-off which occurs when the mobile station moves to a different, neighboring system.

The base station usually monitors each mobile station and assesses the need for a hand-off by periodically measuring the signal strength, bit error rate, or some other dynamic quality measurement. Measurements of the surrounding base stations may be accomplished with the assistance of the mobile station. If the measurement of the base station presently serving the mobile station falls below a predetermined level, the cellular system determines the availability of other channels in neighboring cells, or in the same cell, and transmits a command to the mobile station, via a high speed data message interrupting the speech communications on the voice channel (a blank and burst data message), to retune to a new frequency. The mobile station mutes the speech and tunes to the radio channel indicated in the blank and burst data message. Speech transmission is resumed after the mobile station has tuned to the new channel.

A number of complications are introduced to the hand-off process when transmissions in the cellular system are digitized and encrypted. One practical problem arises from the fact that the encryption system counter in one base station may be completely out of synchronization with the corresponding counter in another base station. This is particularly true with respect to inter-system hand-off where base stations are operated by commercially distinct, and often competing, entities. For obvious practical reasons, the mobile stations are slaved to the base station with regard to synchronization. The essential issue in terms of hand-off is how to ascertain the counter value at the new base station with a minimum of interruption to the speech, or data, stream. If the new base station to which a hand-off is desired is not synchronized to the old base station, then upon hand-off, the new base station must transmit to the mobile station the new counter value which may then be used, if necessary, to reset the counter in the mobile station.

Another practical problem in performing hand-off of an encrypted telephone conversation is caused by transmission delays in the communications between elements in the land network, for example, between the base stations and a MTSO which coordinates the operation of the cellular system. Such delays may prevent the mobile station from tuning to the new base station frequency at exactly the same time that the new base station begins broadcasting the new counter value. In particular, the blank and burst data message commanding the mobile station to tune to a new base station frequency is usually sent by the MTSO to the old base station and relayed to the mobile station. At the same time, the MTSO signals the new base station to begin broadcasting the new counter value. However, the transmission delays in the communications link between the MTSO and the old base station are not necessarily the same as the transmission delays in the communications link between the MTSO and the new base station. For example, the former communications link may not have the same number of signal repeaters as the latter communications link. Hence, there could be a period of uncertainty from the time the mobile station becomes tuned to the new base station frequency and the time that the new base station begins broadcasting the new counter value.

A method and apparatus for establishing synchronization and resynchronization of an encryption system upon hand-off of communications between cells of a duplex cellular radio system is disclosed in U.S. Pat. No. 5,081,697 entitled "Resynchronization of Encryption Systems upon Hand-off" and incorporated herein in its entirety by reference.

If the base stations were able to operate in a synchronized mode, the advantage for overall system performance is that the time to perform hand-off and consequently the break in speech, or data, transmission would be substantially reduced or eliminated. Systems like GSM require the mobile to acquire synchronization of candidate hand-off base stations in the event of receiving a hand-off command requiring the mobile to switch to that candidate base station. Thus, for GSM, the cipher system need not be synchronized from the system point of view because the mobile is required to figure out the synchronization information before hand-off. With these systems there is not any delay of the hand-off procedure due to the requirement of establishing cipher synchronization. Obtaining synchronization information from neighboring base stations is possible in GSM due to the 8 time slot arrangement. As the mobile station is active for only one of eight slots, time is available for the mobile station to acquire the synchronization information during the remaining 7 slots.

For systems like the North American Digital Cellular System (i.e., EIA/TIA IS-54B), or ADC, which currently operates in a three-slot TDMA mode, there is no spare time left between transmit and receive slots for reading neighboring base station control channels. ADC mobile stations are therefore unable to obtain cipher synchronization information from candidate base stations prior to hand-off and therefore must do so after tuning to a new base station resulting in an unacceptable interruption in speech, or data, transmission. For ADC, the only way of eliminating the time to perform resynchronization of the cipher after hand-off is to mandate that all traffic channels on all base stations be synchronized with respect to encryption. Unfortunately, this solution imposes a severe, and perhaps unfeasible, requirement on the system, especially for inter-system hand-offs.

System synchronization may be viewed as three separate tasks of increasing complexity: intra-cell synchronization, inter-cell synchronization, and inter-system synchronization. It is, for example, relatively easy to provide synchronization between all channels on a site (i.e., intra-cell synchronization.) Referring to FIG. 1, for example, all traffic and control channels within cell C1 may be synchronized to each other, all traffic and control channels within cell C2 may be synchronized to each other, and so forth, with a relatively modest amount of complexity in the network. The next level of system synchronization would be to synchronize all traffic and control channels on cells C1–C10 to each other (i.e., inter-cell synchronization.) This is a significantly more complex task. Ultimately, system synchronization between all cells belonging to different system operators can be synchronized (i.e., inter-system synchronization.) Inter-system synchronization is, from a practical point of view, an immensely difficult task.

Intra-cell hand-offs often occur within the same cell because, for example, a particular channel is subject to severe interference. If there exists intra-cell synchronization then the hand-offs may be accomplished without requiring the mobile to re-synchronize the cipher and thereby eliminating gaps in the voice or data transmission. For example, a control channel and traffic channels within the same cell can, with relative ease, be synchronized. Thus, a mobile can use the cipher synchronization information acquired while on the control channel for use when commanded to communicate on a traffic channel without re-establishing the cipher synchronization thereby eliminating gaps in the conversation.

For hand-offs where there is no cipher synchronization, the mobile station must acquire synchronization information from the new base station before transmitting as described in U.S. Pat. No. 5,081,679 entitled "Resynchronization of Encryption Systems upon Hand-off" also assigned to the same assignee as the present invention and incorporated by reference herein. After hand-off, the mobile ceases communication to the old base station and looks for synchronization information coming from the new base station. When such information is acquired, the mobile starts transmitting to the new base station. Thus, although security is ensured since the user information, e.g. speech, is never sent with the encryption disabled, there is required some delay in re-establishing the conversation.

It is envisaged that many hybrid systems will exist having synchronization to varying degree. For efficiency, the mobile station should not attempt to re-establish cipher synchronization where synchronization already exists. Conversely, the mobile station should attempt to re-synchronize its cipher when synchronization between hand-off channels does not exist. There exists therefore a need to identify when synchronization is required and the manner in which such synchronization should be effected.

SUMMARY OF THE INVENTION

The aforementioned problem of cipher re-synchronization upon handoff is ameliorated by the present invention which provides a method and apparatus for selectively indicating when re-synchronization is necessary. If the old channel and the candidate channels are synchronized with respect to one-another, then an indication thereof is transmitted to the mobile station with hand-off instructions thereby eliminating the need to resynchronize and minimizing gaps in the conversation. If re-synchronization is required then the system provides an indication of which type of re-synchronization is preferred.

In a digital cellular communication system employing base stations and mobile stations exchanging ciphered digital data, a method for indicating cipher synchronization is presented which comprises transmitting from a base station to a mobile station a message over an old channel instructing said mobile station to go to a new channel. The message, which may be an ITCD or handover message, further includes an indication of whether or not cipher resynchronization is required to the new channel. After receiving the message at the mobile station, the mobile station acquires a new channel and resynchronizes or does not resynchronize it cipher to the new channel in accordance with the indication. By so doing, handover time may be substantially decreased by not performing resynchronization when the new channel is already synchronized to the old channel.

To further optimize handover time, another aspect of the present invention provides for different options for resynchronization when resynchronization of the cipher is required. By so doing, security can be traded off for handover speed. If security is to be optimized, the mobile station inhibits transmission of voice or data information until the cipher is resynchronized to the new channel.

In yet another embodiment, the transmission of voice or data information is performed with the cipher disabled until the cipher is resynchronized to the new channel.

In still another embodiment, a predetermined value is assigned as the block counter in the mobile station and the same predetermined value as the block counter in the base station. The predetermined value is used to exchange ciphered data between the mobile station and the base station until such time as a new value for the block counter is received by the mobile station from the new channel and the block count is replaced with the new value. This allows for a modest level of security while giving due consideration to handover speed.

In still a further embodiment a timer is set within the mobile station when unciphered data is being transmitted. After a predetermined period of time, the mobile station provides an indication to the user that the mobile station is not operating in a ciphered mode thereby avoiding long periods of unciphered communication from unknowingly taking place.

These and other features and advantages of the present invention will be readily apparent to one of ordinary skill in the art from the following written description when read in conjunction with the drawings in which like reference numerals refer to like elements.

BRIEF DESCRIPTION OF THE DRAWINGS

An exemplary embodiment of the invention will now be described in more detail with reference to the accompanying drawings, in which.

DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail. Throughout the following, the terms speech, voice, data, information, and derivatives thereof are used interchangeably to refer to digital representations of information which is being communicated.

In order for a cellular system to be able to page a mobile station for incoming calls and to allow a mobile station to be able to place calls into the system, existing cellular systems provide a so-called control channel to serve this purpose. One example of such a control channel is found, for example, in EIA/TIA IS-54B. This control channel is referred to as the analog control channel because of the analog modulation method used. For future revisions of IS-54B, it is envisaged that a new control channel will be in use which will use the same digital modulation method employed for the traffic channels, i.e. DQPSK (differential quadrature phase shift keying). One such control channel is described in the aforementioned co-pending U.S. patent application Ser. No. 08/147,254 and is referred to as the Digital Control Channel (DCCH). In such a system, each DCCH comprises several distinct logical channels. These channels provide means for paging the mobile station (paging channel), broadcast of system information (BCCH), traffic channel assignments (Access Channel), and means for the mobile to access the system to place calls (Access Response Channel, ARCH). The BCCH may be used for providing cipher synchronization information. The CEN HIGH field together with other information as described in aforementioned co-pending U.S. patent application Ser. No. 07/956,640 may be used to convey cipher synchronization information.

On the BCCH, the cipher synchronization information can be periodically transmitted. Thus, when the mobile station is in idle mode (i.e. not engaged in any call activities), the mobile can read the synchronization information provided on the BCCH. Once a mobile is assigned to a traffic channel (or starts communicating on the DCCH itself), the Initial Traffic Channel Designation (ITCD) message may contain information (i.e., a cipher management mode (CMM)) about whether the target traffic channel (TCH) is synchronized with the DCCH with respect to cipher. Similarly, the hand-off command received over the FACCH may also contain a CMM field. In one embodiment, the CMM is a two bit field in the ITCD, or FACCH hand-over message indicating whether or not synchronization exists between the old channel and the candidate TCH. In the case where the CMM indicates that the mobile station needs to re-synchronize the cipher after switching channel, the ITCD and/or hand-off messages may indicate from the value of the CMM if the mobile station shall transmit with the cipher disabled until it acquires synchronization information or cease transmitting until it acquires synchronization information as will be discussed in greater detail hereinafter. Other re-synchronization options are also possible as will be described hereinafter. This permits initial deployment of the present invention without inflicting undue complexity regarding network implementation and allows the evolution to an implementation in which most of the channels are synchronized. Furthermore, the cellular operator has the flexibility in the case of non-synchronized channels, to optimize for highest possible security or minimize interruption of the service.

Referring to FIG. 1, each of the cells C1–C10 is allocated a plurality of voice or speech channels and at least one access or control channel according to known techniques. The control channel is used to control or supervise the operation of mobile stations by means of information transmitted to and received from the mobile stations. Such information may include, for example, incoming call signals, outgoing call signals, page signals, page response signals, location registration signals, voice channel assignments, maintenance instructions and hand-off instructions. The control channel or voice channels may operate either in an analog or a digital mode or a combination thereof. In the digital mode, analog messages, such as voice or control signals, are converted to digital signal representations prior to transmission over the RF channel. Purely data messages, such as those generated by computers or by digitized voice devices, may be formatted and transmitted directly over a digital channel.

In a cellular radio system using time division multiplexing (TDM), a plurality of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame.

Figure 2:
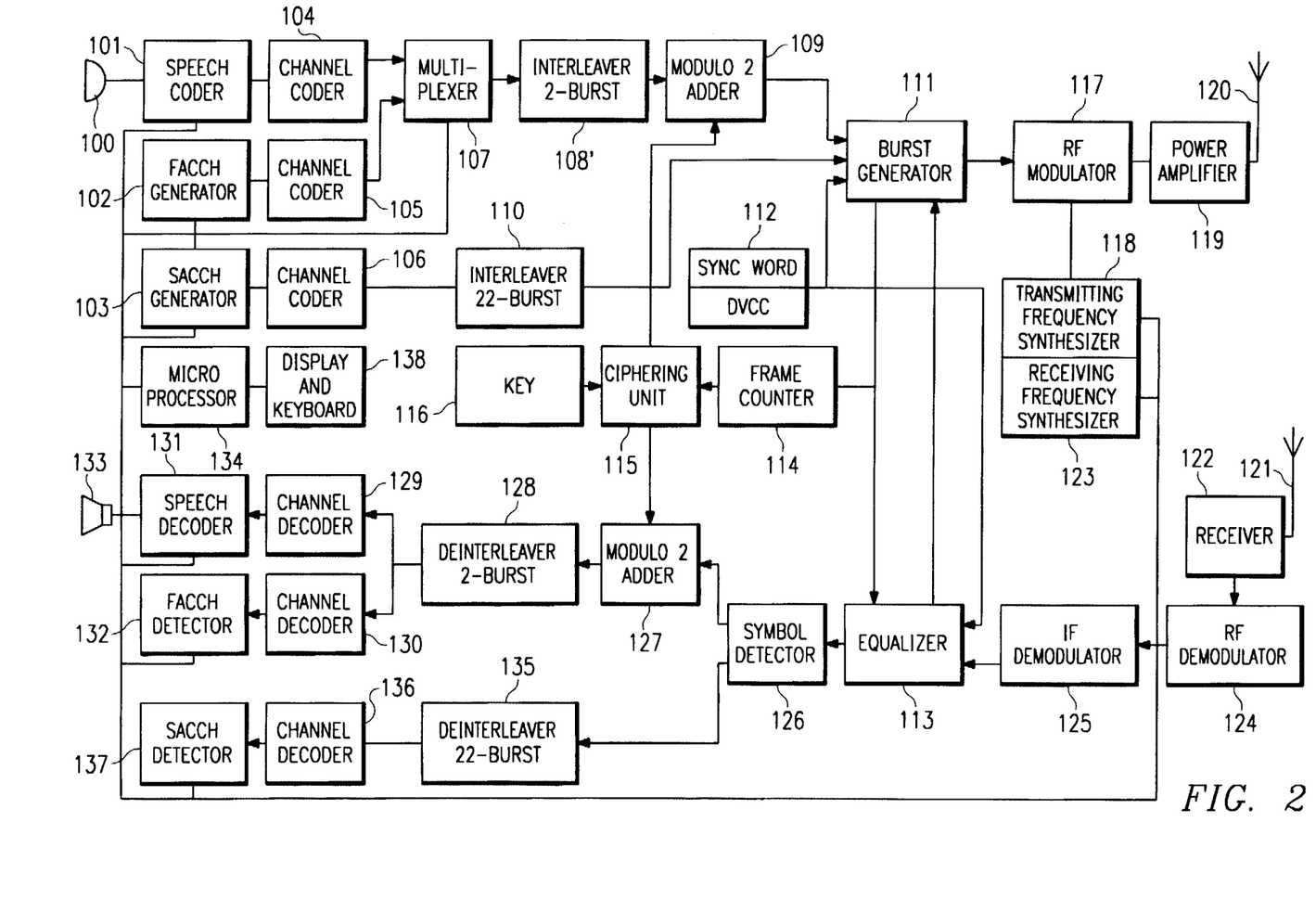
FIG. 2 is a schematic block diagram of mobile station equipment used in accordance with one embodiment of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with a base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length field, e.g. 12 bits, and included as a part of each time slot in the message train (frames). Channel coders 104, 105, 106 are connected to the speech coder 101, FACCH generator 102 and SACCH generator 103, respectively. Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g., 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interleaver 108 which divides each data message to be transmitted by the mobile station (for example, a message containing 260 bits) into two equal but separate parts (each part containing 130 bits) arranged in two consecutive time slots. In this manner, the deleterious effects of Rayleigh fading may be significantly reduced. The output of the 2-burst interleaver 108 is provided as input to a modulo-2 adder 109 where the data to be transmitted is ciphered on a bit-by-bit basis by logical modulo-2 addition with a pseudo-random keystream.

The output of the channel coder 106 is provided as input to a 22-burst interleaver 110. The 22-burst interleaver 110 divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109. The burst generator 111 produces "message bursts" of data, each consisting of a time slot identifier (TI), a digital voice color code (DVCC), control or supervisory information and the data to be transmitted, as further explained below.

Transmitted in each of the time slots in a frame is a time slot identifier (TI), which is used for time slot identification and receiver synchronization, and a digital voice color code (DVCC), which ensures that the proper RF channel is being decoded. In the exemplary frame of the present invention, a set of three different 28-bit TIs is defined, one for each time slot while an identical 8-bit DVCC is transmitted in each of the three time slots. The TI and DVCC are provided in the mobile station by a sync word/DVCC generator 112 connected to the burst generator 111 as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which are integrated according to the time slot format specified by the EIA/TIA IS-54 standard.

Each of the message bursts is transmitted in one of the three time slots included in a frame as discussed hereinabove. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the TI and the DVCC. The burst generator 111 is also connected to a 20 ms frame counter 114 which is used to update a ciphering code that is applied by the mobile station every 20 ms, i.e., once for every transmitted frame. The ciphering code is generated by a ciphering unit 115 with the use of a mathematical algorithm and also under the control of a key 116 which is unique to each mobile station. The algorithm may be used to generate a pseudo-random keystream.

The message bursts produced by the burst generator 110 are provided as input to an RF modulator 117. The RF modulator 117 is used for modulating a carrier frequency according to the π/4-DQPSK technique (π/4 shifted, differential quadrature phase shift keying). The use of this technique implies that the information to be transmitted by the mobile station is differentially encoded, i.e., two bit symbols are transmitted as 4 possible changes in phase: + or − π/4 and + or − 3 π/4. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to π/4-DQPSK modulation. The digital information is then passed through the equalizer 113 to a symbol detector 126 which converts the two-bit symbol format of the digital data provided by the equalizer 114 to a single bit data stream.

The symbol detector 126 produces two distinct outputs: a first output, comprised of digitized speech data and FACCH data, and a second output, comprised of SACCH data. The first output is supplied to a modulo-2 adder 127 which is connected to a 2 -burst deinterleaver 128. The modulo-2 adder 127 is connected to the ciphering unit 115 and is used to decipher the encrypted transmitted data by subtracting on a bit-by-bit basis the same pseudo-random keystream used by the transmitter in the base station to encrypt the data. The modulo-2 adder 127 and the 2-burst deinterleaver 128 reconstruct the speech/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and a FACCH detector 132, respectively. The speech decoder 131 processes the speech data supplied by the channel decoder 129 in accordance with a speech coder algorithm, e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH detector 132 are forwarded to a microprocessor 134.

The second output of the symbol detector 126 (SACCH data) is supplied to a 22-burst deinterleaver 135. The 22-burst interleaver 135 reassembles and rearranges the SACCH data which is spread over 22 consecutive frames. The output of the 22-burst deinterleaver 135 is provided as input to a channel decoder 136. SACCH messages are detected by a SACCH detector 137 and the control information is transferred to the microprocessor 134.

The microprocessor 134 controls the activities of the mobile station and communications between the mobile station and the base station. Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Figure 3:
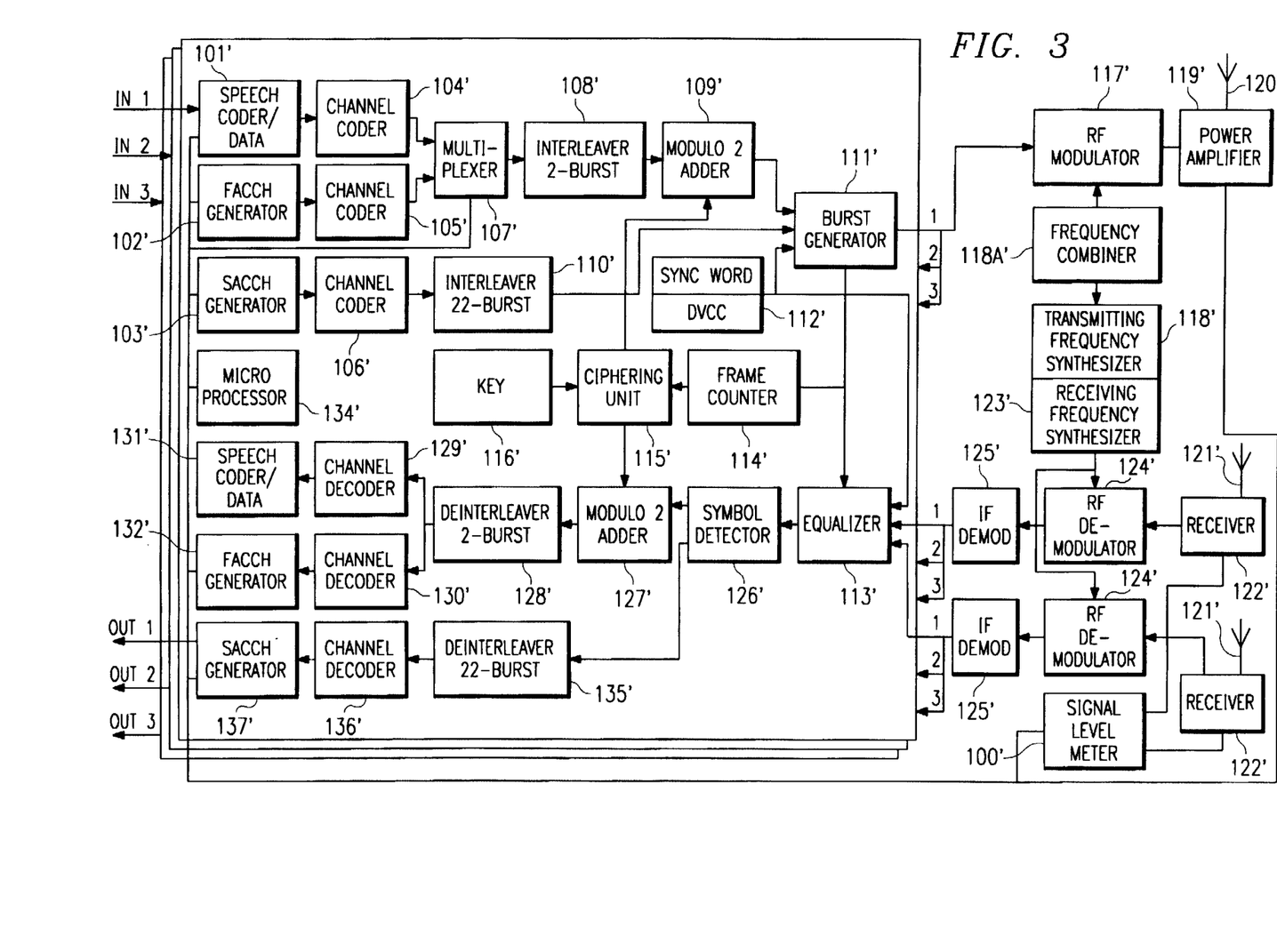
FIG. 3 is a schematic block diagram of base station equipment used in accordance with one embodiment of the present invention.

Referring next to FIG. 3, there is shown a schematic block diagram of the base station equipment which are used in accordance with the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125'. Furthermore, the base station includes a programmable frequency combiner 118A' which is connected to a transmit frequency synthesizer 118'. The frequency combiner 118A' and the transmit frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does, however, include a signal level meter 100' connected to measure the signal received from each of the two receivers 122' and to provide an output to the microprocessor 134'. Other differences in equipment between the mobile station the base station may exist which are well known in the art.

As disclosed above and used hereinafter, the term "keystream" means a pseudo-random sequence of binary bits or blocks of bits used to encipher a digitally encoded message or data signal prior to transmission or storage in a medium which is susceptible to unauthorized access, e.g., an RF channel. A "keystream generator" means a device which generates a keystream by processing a secret key comprised of a plurality of bits. Encryption may be simply performed by a modulo-2 addition of the keystream to the data to be encrypted. Similarly, decryption is performed by a modulo-2 subtraction of an identical copy of the keystream from the encrypted data. In the description which follows, the words "encryption", "cryptographically encode", "encipher" and "scramble" and their derivatives are used interchangeably.

Generally speaking, the keystream generator provides a mechanism, represented by elements 115 and 115' of FIGS. 2 and 3, respectively, for expanding a relatively small number of secret bits, i.e., the secret key, represented by elements 116 and 116', into a much larger number of keystream bits which are then used to encrypt data messages prior to transmission (or storage). To decrypt an encoded message, the receiver must "know" the index to the keystream bits used to encrypt the message. In other words, the receiver must not only have the same keystream generator and generate the same keystream bits as the transmitter, but also, the receiver keystream generator must be operated in sync with the transmitter keystream generator if the message is to be properly decoded. Synchronization is normally achieved by continuously transmitting from the encoding system to the decoding system the contents of every internal memory device, such as bit, block or message counters, which participate in the generation of the keystream bits. Synchronization may be simplified, however, by using arithmetic bit block counters, such as binary counters, and incrementing those counters by a certain amount each time a new block of keystream bits is produced. Such counters may form a part of a real-time, i.e. hours, minutes and seconds, clock chain. A keystream generator relying on the latter type of counters is known as the "time-of-day" driven keystream generator to which reference was made hereinabove.

In general, the present invention uses a duplex cipher keystream generator so that synchronization in either the direction of base station to mobile station or the direction of mobile station to base station also establishes synchronization in the other direction.

Figure 4A:
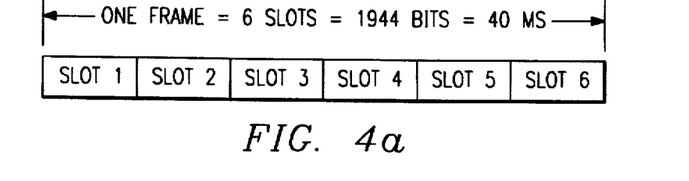
FIG. 4a is a pictorial representation of the TDMA frame structure.
Figure 4B:
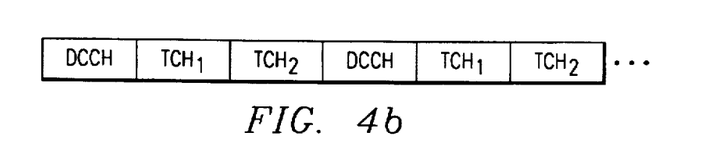
FIG. 4b is a pictorial representation of the TDMA frame structure illustrating how a digital control channel (DCCH) may be interleaved on the same frequency with traffic channels (TCH)

Referring next to FIG. 4a, a TDMA frame as defined in EIA/TIA IS-54B is shown. The traffic channels are organized in time division mode. For example, a full rate channel consists of every third slot e.g., slot 1 & slot 4, slot 2 & slot 5 and slot 3 & slot 6. The same assignment of slots are used in subsequent TDMA frames. FIG. 4b illustrates an example of how one of the full rate channels is employed as a control channel (DCCH) and the other two channels are assigned as traffic channels (TCH) used to carry user services i.e., speech or data transmission. The formatting of the DCCH may be similar to what was described hereinabove for the FACCH channel used on the TCH. As is obvious to one of ordinary skill in the art, there can be differences in the interleaving and channel coding schemes but the objective is similar to the FACCH channel. One difference is that some messages on the DCCH (sent on a particular logical sub-channel of the DCCH named BCCH) are directed to all mobiles locked to this cell. In the aforementioned co-pending U.S. patent application Ser. No. 08/147,254, this channel is denoted BCCH. The BCCH contains broadcast information (sent to all mobiles i.e., un-addressed messages) informing the mobile about the characteristics of the cell e.g., system owner, service menus, rules for accessing the system, etc. Another aspect of the DCCH is to assign a particular mobile station to a specific traffic channel (addressed message) on which the requested service e.g., a speech call, will take place. If the communication on the control channel itself shall be performed in encrypted mode, the synchronization is established by the inherent duplex-aspect of both the control channel itself and the duplex form of cipher used. The mobile station acquires the cipher synchronization information on the un-encrypted BCCH and may thereafter both receive and transmit in encrypted mode if so requested over the air-interface or by invocation of the system.

Figure 4C:
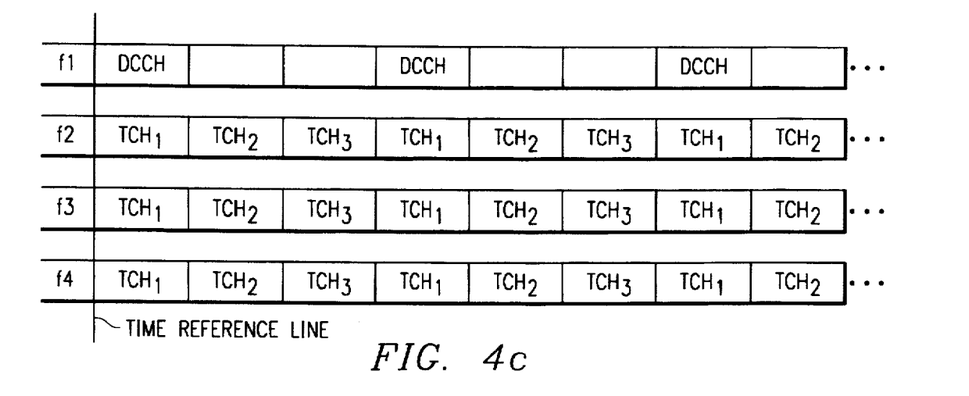
FIG. 4c is a pictorial representation of four TDMA frequencies whose slots are time aligned (i.e., synchronized)
Figure 4D:
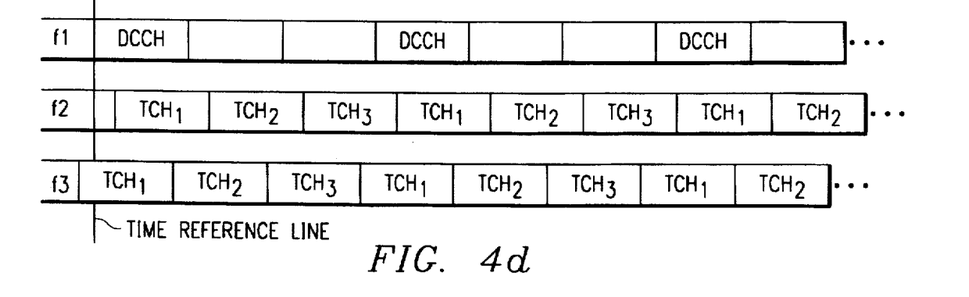
FIG. 4d is a pictorial representation of three TDMA frequencies whose slots are mis-aligned in time (i.e., un-synchronized)

FIG. 4c shows three frequencies assigned to one base station. On frequency $f_1$, only the channel assigned as DCCH is shown. The other channels may carry other traffic, such as a TCH, or an additional DCCH if needed to serve the cell for capacity reasons. The time slots on frequencies $f_1-f_3$ are all time aligned, i.e. the time slots are not staggered in time. Time alignment is denoted as physical alignment. FIG. 4d, for example, shows an example where physical alignment is not present. Note that the frequencies of interest (in case of hand-off) may not be sent from the same base station, but may be transmitted by neighboring base stations. Thus, FIG. 4d is a typical representation where TDMA frames are not physically aligned i.e., there is no synchronization.

Figure 4E:
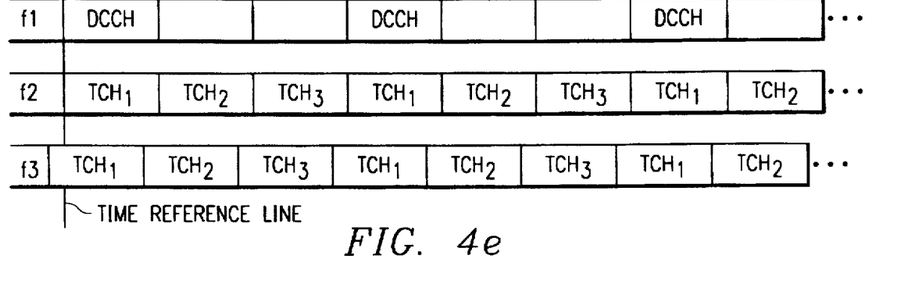
FIG. 4e is a pictorial representation of three TDMA frequencies where one frequency used for TCH is time aligned with the frequency used as the DCCH and where another TCH frequency is used whose slots are mis-aligned (i.e., un-synchronized) with the DCCH frequency.

In FIG. 4e, an example of intra-cell synchronization is shown. Frequency $f_1$ is employed as the DCCH carrier and frequency $f_2$ which is broadcast from the same base station as frequency $f_1$ is employed as a TCH carrier. Intra-cell synchronization is assumed and therefore the TCH on frequency $f_2$ is physically aligned (i.e., time aligned) with the DCCH on frequency $f_1$. A third frequency $f_3$ is broadcast from a neighboring base station and is not physically aligned (i.e., offset in time) with the DCCH. This scenario represents a modest level of system synchronization in which all the channels broadcast from a particular base station are synchronized (i.e., time aligned).

Figure 4F:
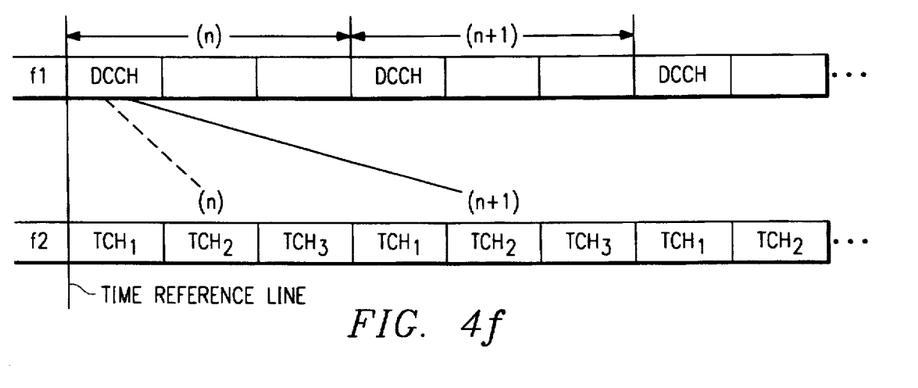
FIG. 4f is a pictorial representation of block count incrementation after receiving an ITCD message.
Figure 4G:
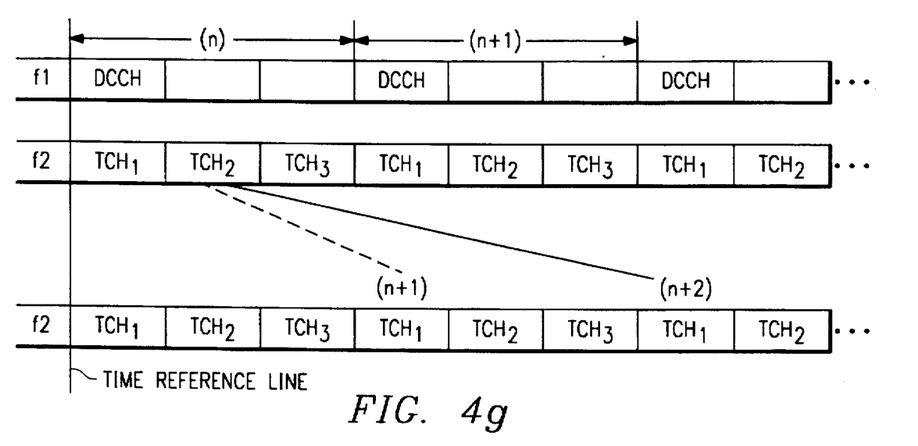
FIG. 4g is a pictorial representation of block count incrementation after receiving a FACCH hand-over message.

FIG. 4f shows an implementation where the DCCH on a regular basis transmits synchronization information for encryption. Once the mobile has acquired this message it will internally update the block counter by one for each new received time slot. Thus, the domain of a block counter value spans three time slots indicated by the arrows. The ( ) around the block counter indicates that the value is not explicitly transmitted but logically associated to the time slots according to the block counter updating process. When a mobile is assigned a TCH it will maintain the internal update process and therefore it can always associate each time slot assigned to its TCH with the correct counter value. In FIG. 4f the mobile is assigned TCH2. Because of processing time required by the mobile it may not be able to read the first possible TCH$_2$ occurrence. In this example it is assumed that the first slot which is read by the mobile is the second instance of that TCH which is indicated by the non-dotted line. Since the mobile has an internal clock running, so the mobile station knows where in the TDMA frame it shall receive and transmit, the mobile station also knows that the block counter on the first read TCH slot has the value of n+1.

Since system synchronization is controlled by the operator, an indication of system synchronization is provided in the ITCD, or hand-off message according to a first aspect of the present invention. A cipher management mode (CMM) message is included in an ITCD, or hand-over message as described hereinabove. These messages are broadcast to a specific mobile station and may include other information such as channel number, DVCC, etc.

In one embodiment of the present invention the CMM comprises a two bit code. Mode 00, for example, indicates that no re-synchronization is needed after hand-off and that the mobile station need not wait for the block counter message before it starts transmitting on the new channel. The mobile station acquires the new TCH and continues transmitting ciphered information uninterrupted except for the time required to retune the synthesizer and lock on to the new TCH.

It is obvious to one of ordinary skill in the art that the CMM information may be conveyed explicitly, or implicitly, in a number of different ways. The example of a two bit code contained within the ITCD, or hand-off message, is provided as an illustration only and it not intended to limit the present invention to this specific implementation. Rather, the simple example of a two bit code is used to provide a clear and enabling disclosure of the present invention.

According to another aspect of the present invention, the CMM may also indicate the level of security, or method of re-synchronization required. For example, if re-synchronization is required upon hand-off the mobile station may be instructed to adopt one of three possible alternatives. If maximum security is required, which may be for the purposes of example associated with a CMM code of 01, then the mobile station inhibits transmission until cipher synchronization is established with the new channel. The mobile station may transmit a dummy burst to announce its presence on the new channel and then wait for receipt of a block counter message from the new channel. Once the block counter message is received, then the mobile station starts the block counter incrementation process, enables the cipher in both forward and reverse directions and resumes transmission. This mode is further described, for example, in aforementioned U.S. Pat. No. 5,081,679.

Alternatively, if security may be traded for hand-off speed, a lower form of security associated with, for example, CMM code 10 may be included in the ITCD or handover message. In this mode, the mobile station sets the block counter to a predetermined value which can be a constant or a function of a value known to both the mobile station and the base station, for example, the channel number, time slot indicator, DVCC, etc. and continues to transmit with the cipher enabled using this value until such time as the mobile station receives a block counter message. Once the block counter message is received by the mobile station, it replaces the predetermined value with the value received in the block counter message and starts the block counter incrementation process as described hereinabove.

Finally, if hand-off speed is to be optimized, the mobile station may receive, for example, CMM mode 11. In this mode, the mobile station transmits to the new base station with the cipher disabled (i.e., no encryption) and continues to do so until such time as a block count message is received. Once the block counter message is received by the mobile station, the mobile station enables the cipher with the value received in the block counter message and starts the block counter incrementation process as described hereinabove.

When operating in CMM mode 11, as denoted above, the mobile station and base station transmit "in the clear", which is to say that no cipher security is used and the signal can be intercepted with relative ease. If a new block counter message is not successfully received by the mobile station, then the lack of security may continue for some seconds. In order to avoid long periods of time transmitting with the cipher disabled, the mobile station may start a timer after initiating transmission on the new TCH. If this timer reaches, e.g., 5 seconds the mobile may automatically terminate the call or alert the user by, e.g., an audible alert. Similarly, the system may terminate the call, or interrupt the service, if a similar timer expires at the base station. The objective is to minimize the risk of transmitting in both directions for a long time without encryption.

One feature of the present invention is that it allows the system operator to slowly migrate to a fully synchronized system without imposing severe complexity and cost burdens. A system may gradually become synchronized as normal upgrades and new equipment is purchased. By providing the CMM, a system operator may take full advantage of improvements in system synchronization while allowing for normal unsynchronized access. Furthermore, since the mobile stations are able to respond in one of three methods to re-synchronize the cipher when a synchronized ITCD or hand-off is not possible, the operator, or the mobile station itself, can, on an individual basis chose between the most secure way of re-synchronization or can minimize the interruption of the service during hand-off.

It should be noted that the CMM in the most general implementation of the invention may not only be a simple on/off indication but may also contain the actual value of the block counter to be used on the TCH associated with the time of the ITCD message. Furthermore, the TDMA frames may not be physically aligned but the ITCD and hand-off messages may contain information about the time shift of the present and target channels. As is obvious to one of ordinary skill in the art, encoding the physical alignment information and the CMM information may be performed in many ways. For example, when an ITCD message contains a CMM but no physical alignment information, the mobile may assume implicit alignment of TDMA frames. Many other variations of conveying this information are possible.

A further complication is that at the location of the mobile the received TDMA frames may not be fully time aligned if the mobile is close to one base station and far from the target base station even though the transmitters may be synchronized between the base stations (i.e., inter-cell synchronization). This is a result of the fact that electromagnetic waves travel at the speed of light which is not infinite. The system may send as information to correct the misalignment as in the hand-off message. This is described, for example, in aforementioned U.S. patent application Ser. No. 08/203,028. For simplicity, the present description assumes that physical alignment is in place once the system enables the CMM and that no adjustment is necessary due to large cell sizes.

Figure 5:
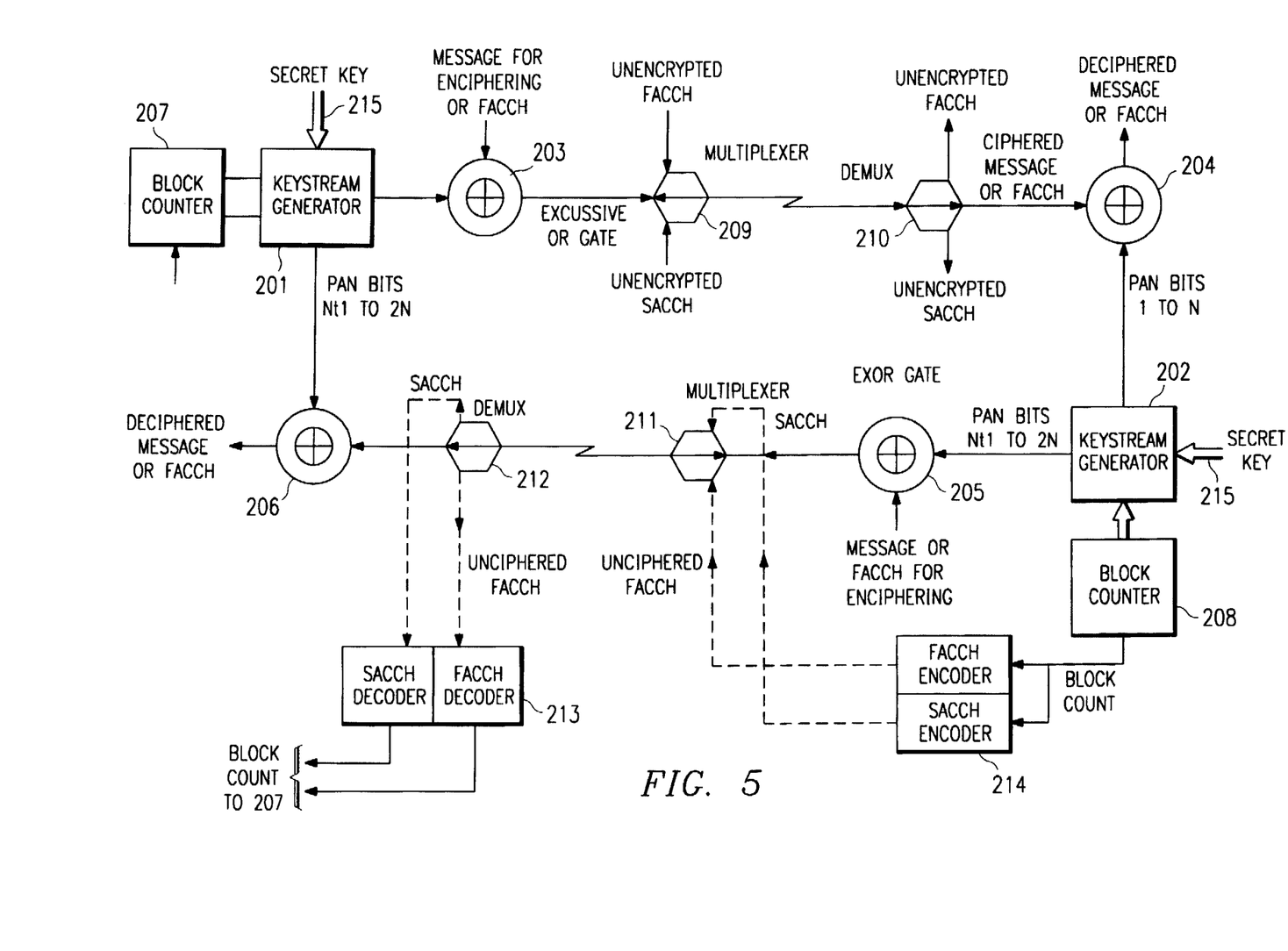
FIG. 5 is a schematic block diagram of mobile station/ base station equipment used in accordance with the present invention to establish duplex synchronization.

Referring now to FIG. 5, there is shown therein a schematic block diagram of a duplex encryption system constructed in accordance with the present invention. The encryption system shown in FIG. 5 is used for the encryption and decryption of speech traffic in both directions of a voice channel, i.e., the direction of base station to mobile station and the direction of mobile station to base station. Keystream generators 201, 202 produce a number 2N of pseudo-random output bits (keystream) at the mobile station and base station, respectively. The pseudo-random bits are a function of a plurality of fixed bits and a plurality of variable bits which change after the production of each block of 2N bits. The fixed bits may include, for example, the bits of a secret key 215. The variable bits may include the state values of block counters 207, 208, but may, more generally, include the state values of some or all of the flip-flops or internal memory devices in the keystream generators 201, 202 respectively. At one end of the communications link, e.g., the base station, the first N pseudo-random bits in the block of 2N bits is used for encryption while the second N pseudo-random bits is used for decryption. At the other end, e.g., the mobile station, the use is reversed, i.e., the first N bits (1 to N) are used for decryption and the second N bits (N+1 to 2N) are used for encryption.

Encryption and decryption may be performed by bitwise modulo-2 addition of the keystream bits to a sequence of message or FACCH bits in modulo-2 adders 203, 206, respectively, at one end of the communications link and modulo-2 adders 205, 204, respectively, at the other end. The message can be a speech coder frame or a block of data from any other source, e.g. a block of data related to a data service. Each of the modulo-2 adders 203, 204, 205, 206 may be constructed from a plurality of Exclusive OR (XOR) gates. Since modulo-2 addition and modulo-2 subtraction are identical operations, the second addition at the receiver of the same keystream used for encryption at the transmitter recovers the original message or FACCH bits. Such bit-by-bit encryption/decryption technique exhibits increased tolerance for radio transmission errors in that an erroneously received bit results in only one bit error after decryption. The particular encryption/decryption technique, however, is not integral to the operation of the present invention and the keystream bits may equally be used, for example, to control the order in which the message or FACCH bits are included in the transmitted signal, i.e., transposition. Similarly, a combination of the modulo-2 addition and the transposition techniques may be used without departing from the teachings of the present invention. It will be noted that numerous ones of the components shown in FIG. 5 are similarly shown in FIGS. 2 and 3 and, even though not discussed in connection with FIG. 5 their operation and function has already been discussed above. FIG. 5 shows the encryption taking place after channel encoding and interleaving. It is obvious to one of ordinary skill in the art that encryption may also be performed before channel encoding.

Figure 6:
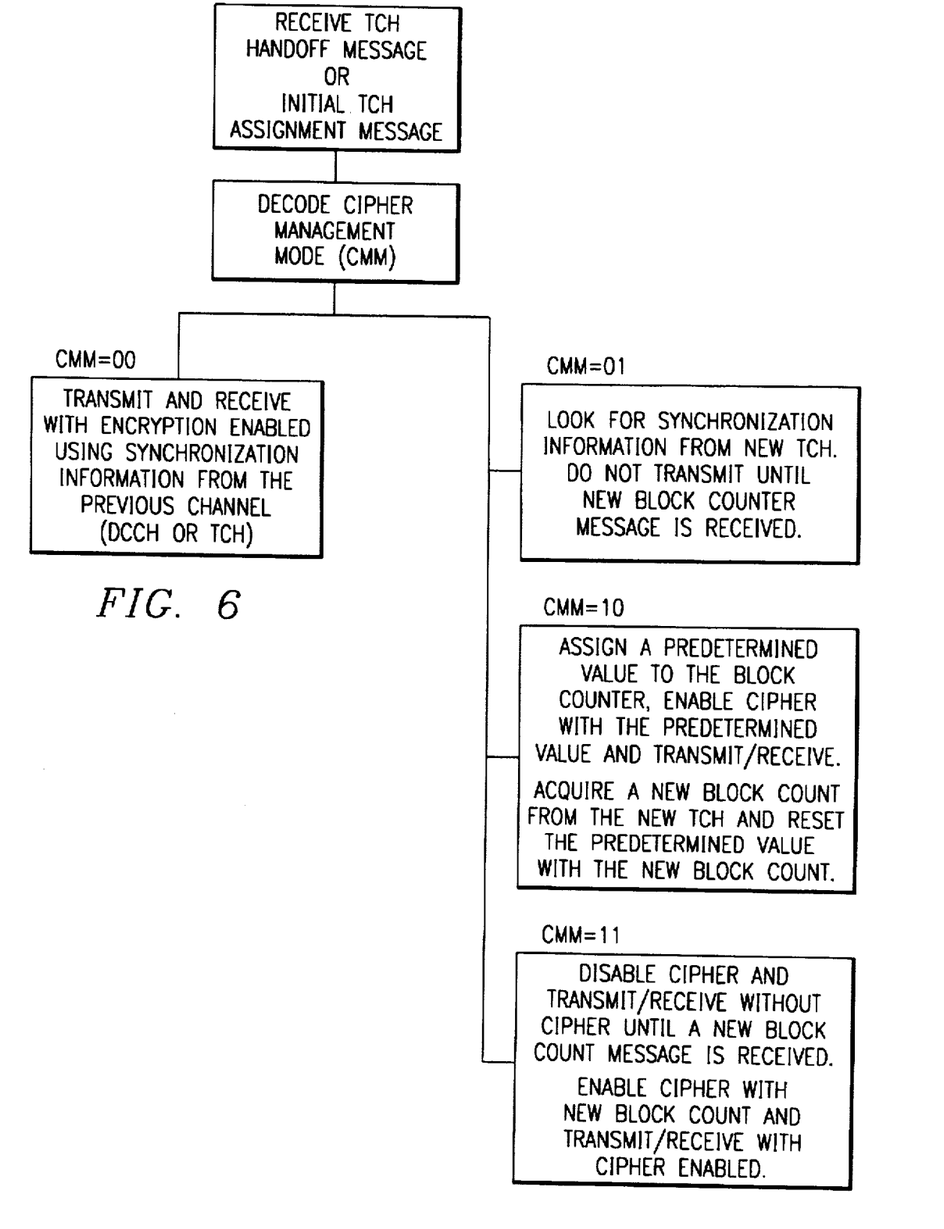
FIG. 6 is a flow chart illustrating the various cipher management options used in accordance with one embodiment of the present invention.

In FIG. 6 is shown a flowchart illustrating the handover process in accordance with the possible CMM options.

While the present invention has used as an example the acquisition of a traffic channel, it is also considered within the scope of the present invention that the techniques described hereinabove may also be employed to provide synchronization information when the mobile station is instructed to acquire a new control channel.

While the present invention has been described with respect to a particular embodiment, those skilled in the art will recognize that the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a digital communication system employing base stations and mobile stations exchanging ciphered digital data, a method for indicating cipher synchronization which comprises:

transmitting from a base station to a mobile station a message over an old channel being received by said mobile station instructing said mobile station to acquire a new channel, said message including an indication of whether or not to resynchronize its cipher upon acquiring the new channel;

receiving said message in said mobile station; and acquiring said new channel in said mobile station and resynchronizing or not resynchronizing said cipher at said mobile station in accordance with said indication.

2. A method according to claim 1, in which said message further includes an indication of which one of a plurality of different options for obtaining cipher resynchronization is to be selected by said mobile station when resynchronization of the cipher is required.

3. In a digital communication system employing base stations and mobile stations exchanging ciphered digital data, each of said base stations and said mobile stations including a block counter which is used in generating said ciphered data, a method for cipher synchronization which comprises:

transmitting from a base station to a mobile station a message over an old channel at said base station being received by said mobile station instructing said mobile station to acquire a new channel at a target base station, said message including an indication for the mobile station to resynchronize its cipher;

receiving said message in said mobile station;

acquiring said new channel in said mobile station;

setting the block counter in each of the mobile station and the target base station to a predetermined value;

exchanging ciphered data between said mobile station and said target base station over said new channel with the block counter in each of said mobile station and said target base station being set to said predetermined value;

transmitting from the target base station to the mobile station over said new channel a message containing a new value for the block counter in each of the mobile station and the target base station;

receiving said block counter message in the mobile station;

resetting the block counter in each of said mobile station and said target base station to said new value; and exchanging ciphered data between said mobile station and said target base station over said new channel with the block counter in each of said mobile station and said target base station being first reset to said new value and then incremented at predetermined intervals.

4. In a digital communication system employing base stations and mobile stations exchanging ciphered digital data, each of said base stations and said mobile stations including a block counter which is used in generating said ciphered data, a method for cipher synchronization which comprises:

transmitting from a base station to a mobile station a message over an old channel at said base station being received by said mobile station instructing said mobile station to acquire a new channel at a target base station, said message including an indication for the mobile station to resynchronize its cipher;

receiving said message in said mobile station;

acquiring said new channel in said mobile station;

starting a timer within said mobile station;

exchanging unciphered data between said mobile station and said target base station;

determining whether said mobile station has received from said target base station prior to the expiration of said timer a message containing a new value for the block counter in each of the mobile station and the target base station;

providing a perceptible indication at the mobile station when said timer expires without the mobile station having received said block counter message;

setting the block counter in said mobile station to said new value if said mobile station receives said block counter message prior to the expiration of said timer; and exchanging ciphered data between said mobile station and said target base station if said block counter has been set to said new value, and incrementing said block counter at predetermined intervals.

5. In a radio communications system communicating speech or control data with a plurality of mobile stations over a plurality of radio channels, a method for synchronizing the encryption of said data by said mobile stations comprising the steps of:

transmitting data from said system to a mobile station over a first channel in said system;

transmitting from said system to said mobile station over said first channel an order to switch communications to a second channel in said system, along with an indication of whether synchronization is required for communicating encrypted data on said second channel;

receiving said order and said synchronization indication at said mobile station;

switching said mobile station to said second channel in accordance with said order;

determining at said mobile station from said synchronization indication whether synchronization is required for communicating encrypted data on said second channel;

synchronizing encryption at said mobile station prior to transmitting encrypted data on said second channel if synchronization is required according to said synchronization indication; and transmitting encrypted data from said mobile station to said system over said second channel if no synchronization is required, or if synchronization is required and said mobile station has synchronized encryption, on said second channel.

6. The method of claim 5 wherein said first channel is a control channel, said second channel is a traffic channel and said order is contained in an initial traffic channel designation (ITCD) message.

7. The method of claim 6 wherein said synchronization indication is included in said ITCD message.

8. The method of claim 6 wherein said control channel is a digital control channel (DCCH) including a broadcast control channel (BCCH) which carries synchronization information for use by said mobile station in synchronizing encryption on said DCCH.

9. The method of claim 8 wherein said synchronization information is transmitted periodically on said BCCH.

10. The method of claim 8 wherein each of said system and said mobile station includes a counter which is used in encrypting said data and wherein said synchronization information comprises the value of the counter in said system.

11. The method of claim 5 wherein said first and second channels are traffic channels and said order is contained in a handoff message.

12. The method of claim 11 wherein said synchronization indication is included in said handoff message.

13. The method of claim 11 wherein said handoff message is transmitted in a fast associated control channel (FACCH) portion of said first traffic channel.

14. The method of claim 5 wherein said synchronization indication specifies one of a plurality of actions to be taken by said mobile station if synchronization is required on said second channel.

15. The method of claim 14 wherein each of said mobile stations includes a counter which is used in encrypting said data, said system including a corresponding counter, and wherein said actions include:

abating data transmission on said second channel until said mobile station receives from said system a message to update the counter in said mobile station with the value of the corresponding counter in said system, and thereafter commencing transmission of encrypted data and incrementing of the counter using the updated counter value;

defaulting the counter in said mobile station to a predetermined value and transmitting on said second channel encrypted data using this value until said mobile station receives from said system a message to update the counter in said mobile station with the value of the corresponding counter in said system, and thereafter continuing transmission of encrypted data and incrementing of the counter using the updated counter value; and disabling encryption and transmitting unencrypted data on said second channel until said mobile station receives from said system a message to update the counter in said mobile station with the value of the corresponding counter in said system, and thereafter resuming transmission of encrypted data and incrementing of the counter using the updated counter value.

16. The method of claim 15 wherein a timer is started in said mobile station at the time encryption is disabled, and said transmission of unencrypted data is terminated or said mobile station generates a perceptible alert, if said counter update message is not received by said mobile station prior to the expiration of said timer.

17. In a digital radio system communicating data with a plurality of mobile stations over a plurality of radio frequency (RF) channels, each of said RF channels being divided into a plurality of traffic channels, each of said mobile stations including a counter used in ciphering data transmitted to said system in one of said traffic channels, said system maintaining a corresponding counter, a method for controlling the transmission of ciphered data from said mobile stations to said system comprising the steps of:

exchanging ciphered data between said system and one of said mobile stations over an old traffic channel, said counter in said one mobile station being synchronously incremented with the corresponding counter in said system;

assigning a new traffic channel to said one mobile station;

transmitting from said system to said one mobile station a message including a cipher synchronization code, said code being selectively set to one of a plurality of values including:

a first value which indicates that said one mobile station is to continue incrementing its counter and continue transmitting ciphered data on said new traffic channel;

a second value which indicates that said one mobile station is to inhibit transmission of any data on said new traffic channel until it receives from said system a new counter value whereupon it is to set its counter to said new counter value, begin incrementing its counter, and begin transmitting ciphered data on said new traffic channel;

a third value which indicates that said one mobile station is to set its counter to a predetermined value and to continue transmitting ciphered data on said new traffic channel using said predetermined value until it receives from said system a new counter value whereupon it is to replace said predetermined value with said new counter value, begin incrementing its counter, and continue transmitting ciphered data on said new traffic channel; and a fourth value which indicates that said one mobile station is to transmit unciphered data on said new traffic channel until it receives from said system a new counter value whereupon it is to set its counter to said new counter value, begin incrementing its counter, and begin transmitting ciphered data on said new traffic channel;

receiving said message at said one mobile station; and transmitting from said one mobile station to said system over said new traffic channel as indicated by said cipher synchronization code.

18. The method of claim 17 wherein said message is a handoff message.

19. The method of claim 3 wherein the target base station with said new channel is the same as the base station with said old channel.

20. The method of claim 4 wherein the target base station with said new channel is the same as the base station with said old channel.

21. A base station comprising:

means for processing a first information bit stream;

means for generating a first pseudorandom bit stream;

means for combining said first information bit stream with said first pseudorandom bit stream to generate a first encrypted data stream;

means for transmitting said first encrypted data stream over a first communication channel;

means for processing a second information bit stream;

means for generating a second pseudorandom bit stream;

means for combining said second information bit stream with said second pseudorandom bit stream to generate a second encrypted data stream;

means for transmitting said second encrypted data stream over a second communication channel; and means for transmitting an indication of whether said second pseudorandom bit stream is synchronized to said first pseudorandom bit stream.

22. The base station of claim 21 wherein said synchronization indication is transmitted over said first communication channel to a remote transceiver which is switching from said first communication channel to said second communication channel.

23. The base station of claim 22 wherein:

said remote transceiver is a mobile station;

said first communication channel is a digital control channel or a first digital traffic channel; and said second communication channel is a second digital traffic channel.

24. The base station of claim 23 wherein:

said first pseudorandom bit stream is generated as a function of a first block counter value; and said second pseudorandom bit stream is generated as a function of a second block counter value.

25. The base station of claim 24 wherein:

said first and second block counter values are the same; and said synchronization indication indicates that said second pseudorandom bit stream is synchronized to said first pseudorandom bit stream.

26. The base station of claim 24 wherein:

said first and second block counter values are different;

said synchronization indication indicates that said second pseudorandom bit stream is not synchronized to said first pseudorandom bit stream; and said second block counter value is transmitted from said base station to said mobile station.

27. A radio communication system comprising a plurality of base stations operating on a plurality of communication channels, each of said base stations comprising:

means for processing an information bit stream;

means for generating a pseudorandom bit stream;

means for combining said information bit stream with said pseudorandom bit stream to generate an encrypted data stream;

means for transmitting said encrypted data stream over one of said communication channels; and means for transmitting an indication of whether said pseudorandom bit stream is synchronized to the pseudorandom bit stream generated in another base station for use in transmitting an encrypted data stream over another communication channel.

28. The system of claim 27 wherein said pseudorandom bit stream is generated as a function of a block counter value stored in the base station.

29. The system of claim 27 wherein said synchronization indication is sent to a mobile station which is switching to the other communication channel.

30. The system of claim 29 wherein said synchronization indication is sent in a handoff message transmitted to said mobile station.

31. A mobile station comprising:

means for processing an information bit stream;

means for generating a pseudorandom bit stream;

means for combining said information bit stream with said pseudorandom bit stream to generate an encrypted data stream;

means for transmitting said encrypted data stream over any one of a plurality of communication channels;

means for receiving an indication of whether to resynchronize the generation of said pseudorandom bit stream upon switching transmission from one to another of said channels; and means for resynchronizing said pseudorandom bit stream in response to the receipt of an indication to resynchronize upon switching transmission between said channels.

32. The mobile station of claim 31 wherein said pseudorandom bit stream is generated as a function of a block counter value stored in said mobile station and resynchronized by resetting said block counter value.

33. The mobile station of claim 32 wherein said synchronization indication comprises a code which is selectively set to one of a plurality of values including:

a first value which indicates that upon switching to the other channel said mobile station is to continue incrementing its block counter value and continue transmitting encrypted data on the other channel;

a second value which indicates that upon switching to the other channel said mobile station is to inhibit transmission of any data until it receives a new block counter value whereupon it is to reset its block counter value to the received value, begin incrementing its block counter value, and begin transmitting encrypted data on the other channel;

a third value which indicates that upon switching to the other channel said mobile station is to reset its block counter value to a predetermined value and to continue transmitting encrypted data without incrementing its block counter value until it receives a new block counter value whereupon it is to reset its block counter value to the received value, begin incrementing its block counter value, and continue transmitting encrypted data on the other channel; and a fourth value which indicates that upon switching to the other channel said mobile station is to transmit unencrypted data until it receives a new block counter value whereupon it is to reset its block counter value to the received value, begin incrementing its block counter value, and begin transmitting encrypted data.

34. The mobile station of claim 33 wherein said code is contained in an initial traffic channel designation (ITCD) message transmitted from a base station to said mobile station.

35. The mobile station of claim 33 wherein said code is contained in a handoff message transmitted from a base station to said mobile station.

* * * * *